United States Patent Office 3,480,876
Patented Nov. 25, 1969

3,480,876
LASER CONTROL APPARATUS
Spartacus Barbini, Chaville, France, assignor to
Compagnie Generale d'Electricite, Paris, France
Filed Mar. 14, 1966, Ser. No. 534,113
Claims priority, application France, Mar. 12, 1965,
9,011
Int. Cl. H01s 3/09
U.S. Cl. 331—94.5                                7 Claims

ABSTRACT OF THE DISCLOSURE

A laser beam generator utilizing a laser beam emitter which includes a series of flash tubes for optically pumping the laser beam from a crystal. A high speed power switch circuit breaker device is provided for controlling the successive discharge of the flash tubes at very close intervals.

---

This invention relates to a laser beam generator and is more particularly concerned with a control means to discharge the flashing means associated with said generator.

It is known to use laser beam generators of the type having a crystal and an optical pumping device that comprise several flash tubes which are electrically discharged at precisely predetermined instants. Such a device is disclosed in British Patent No. 966,455. The power of the flash tubes and the intervals of their discharge determine the power characteristics of the stimulated light emission.

It is an object of the invention to provide an improved control apparatus for discharging in succession a plurality of flash tubes at very close intervals.

Still a further object of the invention is to provide an improved control apparatus for the flash tubes permitting the interval between the discharge of any of two tubes to be varied.

Other objects and advantages of the invention will become apparent from the ensuing specification taken in conjunction with the drawing wherein.

Figure 1:
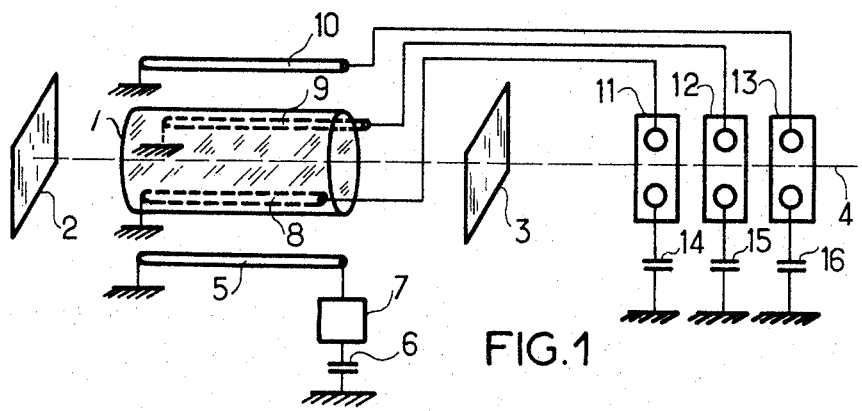
FIG. 1 is a schematic diagram of a laser generator incorporating the novel tube discharge control means.

Referring now to FIG. 1, there is shown schematically an apparatus comprising a laser beam emitter including a crystal 1 placed between a totally reflecting mirror 2 and a mirror 3, the coefficient of transparency of which being sufficient to pass through the coherent light beam 4 emitted by the crystal. The laser emitter further includes a series of flash tubes for the optical pumping necessary to release the laser beam from crystal 1.

One of the flash tubes, for example flash tube 5, is connected to an electric energy supply source 6 (such as a charged condenser) across a circuit-making device 7 including, for example, a high speed circuit breaker or a spark gap device provided with a suitable triggering apparatus (not shown). The other flash tubes 8, 9 and 10 are connected to electric energy sources 14, 15 and 16, respectively, by means of spark gap devices 11, 12 and 13.

The novel apparatus operates as follows: When the device 7 closes the circuit of flash tube 5, the same is discharged and causes a triggering of the laser effect in the crystal 1 culminating in the release of laser beam 4.

The beam 4 successively traverses the space between the electrodes of spark gaps 11, 12 and 13 which are thus triggered at spaced intervals as a function of their respective distances.

The triggering of a series of spark gaps by means of a laser beam is described in detail in U.S. application Ser. No. 406,866, filed Oct. 27, 1964, and assigned to the assignee of this application.

The electric circuits associated with flash tubes 8, 9 and 10 are thus closed in succession and the sequential luminous flashes ensure a continuous emission of the laser beam, resulting in an accrued power.

Depending upon the desired characteristics of the laser beam, flash tubes of various power may be used by connecting the same to condensers of various capacity charged to different potentials.

In order to obtain different discharge characteristics it is further possible to vary the distance of the electrodes within each spark gap device. Varying the distance between the spark gap devices permits an adjustment of the interval between the discharge of the flash tubes. If such an adjustment of distance is insufficient to obtain the desired time lag, optical delaying devices may be interposed in the trajectory of the light beam.

Instead of directing the entire beam through the spark gaps, the same result as discussed above may be obtained by deflecting a substantial portion of the beam for its normal use, while the remaining portion may function as the triggering means for the spark gap devices. This remaining portion may be deflected onto a trajectory determined, for example, by means of a series of successive reflecting mirrors. This makes it possible to substantially vary the time delay without significantly increasing the volume of the apparatus.

Figure 2:
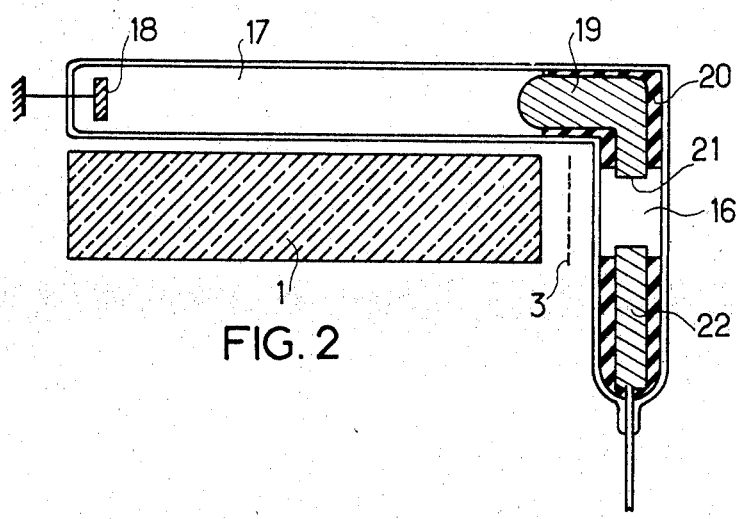
FIG. 2 is a sectional diagrammatical view of a flash tube adapted for use in the present invention.

Turning now to FIG. 2, there is shown a partial sectional view of the flash tube and its spark gap as a unitary structure. The flash tube comprises an L-shaped glass tube 17 and three electrodes 18, 20 and 22. Electrode 20 extends into both legs of tube 17; its terminus 19 with electrode 18 forms the flash discharge electrodes alongside crystal 1, while terminus 21 of electrode 20 constitutes the spark gap with electrode 22. The latter is connected to a voltage source not shown. The electrode 20 is disposed in the elbow portion of the tube and is embedded in an insulating material that separates the flash tube proper from the spark gap. The use of this unitary structure may reduce the size of the laser generator; the dimensions thereof would thus depend mostly upon the distances that are to be maintained between successive flash tubes. Due to the gas tight separation of the flash tube proper and the spark gap between the electrodes 21 and 22, the latter may be filled with a gas of predetermined pressure. The nature of the gas and the pressure thereof may be chosen according to the desired triggering characteristics of the electric spark.

Figure 3:
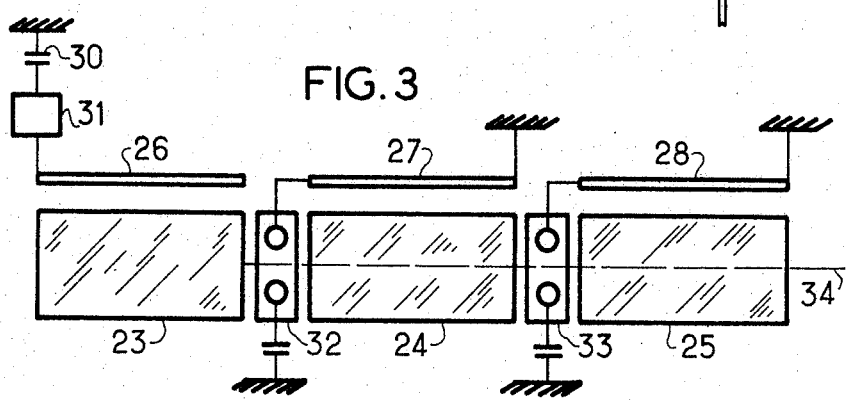
FIG. 3 is a schematic diagram of a coherent light amplifier comprising a plurality of laser generators and incorporating the control means of the invention.

The apparatus shown in FIG. 3 is a modification that permits the use of a multiple laser amplifier.

As shown in FIG. 3, an electric voltage source 30, such as a charged capacitor, is connected to a flash tube 26 through a rapid circuit maker device 31. Tube 26 is associated with a crystal 23. The device 31 may be a spark gap device provided with a suitable control means (not shown). Along the path of the laser beam emitted by crystal 23 there are serially disposed crystals 24 and 25 constituting the secondary lasers and spark gap devices 32 and 33 forming part of the circuits associated with flash tubes 27 and 28 of lasers 24 and 25, respectively. It is to be noted that the unitary structure described hereinabove in connection with FIG. 2 is particularly adapted for use with crystals 24 and 25.

The apparatus diagrammatically shown in FIG. 3 operates in the following manner:

The triggering of crystal 23 produces a coherent light beam 34 which traverses successively spark gaps 32 and 33, the discharge of which causes flashing of tubes 27 and 28. Tubes 27 and 28 exert an optical pumping effect on crystals 24 and 25 and consequently the light beam traversing these crystals will be amplified. The amplification of the light beam in the successive crystals results in a substantially more powerful beam at the output end of the multiple laser amplifier than that emitted by a single laser crystal. The auxiliary lasers 24 and 25 may be disposed in resonant optical cavities closed by mirrors (not shown) which transmit and reflect the light only partially. The light losses due to the penetration of these mirrors by the coherent luminous beam are compensated by the large amplification obtained due to the supertension created by the mirrors. Mirrors of total reflection may be used that are provided wtih an axial aperture allowing only a very thin thread of light to pass.

Although three embodiments of the invention have been depicted and described, it will be apparent that these embodiments are illustrative in nature and that a number of modifications in the apparatus and variations in its end use may be effected without departing from the spirit or scope of the invention as defined in the appended claims.

What is claimed is:

1. In a laser beam generator of the type including means for emitting a laser beam, optical pumping means associated with said laser beam emitting means, the improvement in said pumping means comprising at least one flash tube connected in series with a power switch means including an electric energy storage means and a spark gap defined by spaced electrodes, said electrodes being positioned at either side of the path of said laser beam.

2. The improvement as defined in claim 1, wherein said emitting means includes a crystal, said pumping means includes a plurality of flash tubes associated with said crystal, each of said flash tubes connected in series respectively with a spark gap and a storage means, said spark gaps being positioned in a spaced relation with respect to one another along said path, the electrodes of each of said spark gaps being disposed on either side of said path.

3. The improvement as defined in claim 2, wherein the space between electrodes constituting a spark gap is larger than the space between the electrodes of a preceding spark gap along said path.

4. The improvement as defined in claim 2, wherein at least one of said spark gaps is movable along said path relative to the other said gaps.

5. The improvement as defined in claim 1, wherein said emitting means includes a plurality of crystals disposed in such a manner that the laser beam emitted thereby lies substantially in a single path, at least one of said crystals being associated with an optical pumping means including said spark gap, said electrodes of said spark gap being disposed on either side of said path immediately preceding the crystal with which said pumping means is associated.

6. The improvement as defined in claim 1, wherein said pumping means includes at least one transparent tube constituting said flash tube and said spark gap in a unitary structure, said tube comprising two adjacent chambers, one of said chambers defining said flash tube and enclosing at least two electrodes for discharging said flash tube, the other of said chambers enclosing at least two electrodes defining said spark gap, one of said last named two electrodes being interconnected with one of said first named two electrodes.

7. The improvement as defined in claim 6, wherein said transparent tube is substantially L-shaped, one leg of said tube constituting said flash tube, the other leg enclosing said spark gap.

References Cited

UNITED STATES PATENTS 3,199,049  8/1965  Morse et al. _____ 331—94.5
3,389,348  6/1968  De Maria _____ 331—94.5

JOHN KOMINSKI, Primary Examiner.

U.S. Cl. X.R.

252—301.4